Patented Aug. 9, 1938

2,126,468

UNITED STATES PATENT OFFICE 2,126,468

AZO DYESTUFFS

Karl Holzach, Ludwigshafen-on-the-Rhine, and Ludwig Neumann, Mannheim, Germany, assignors to General Aniline Works, Inc., New York, N. Y., a corporation of Delaware No Drawing. Application June 14, 1935, Serial No. 26,704. In Germany June 27, 1934

4 Claims. (Cl. 260—44.6)

The present invention relates to new azo dyestuffs and a process of producing same.

We have found that new azo dyestuffs having excellent properties as regards fastness are obtained by coupling diazo compounds of aromatic amines containing at least one thiocyanogen group directly attached to the nucleus with nitrogenous coupling components.

Amines of the said kind are for example

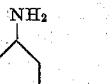
1-amino-4-thiocyanobenzene

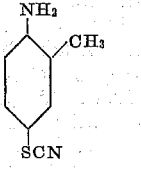
1-amino-2-methyl-4-thiocyanobenzene

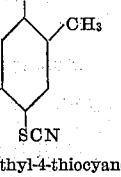
1-amino-2,5-dimethyl-4-thiocyanobenzene

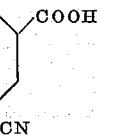
1-amino-4-thiocyanobenzene-2-carboxylic acid

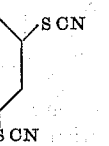
1-amino-2,4-dithiocyanobenzene

Suitable coupling components are all nitrogenous compounds capable of being coupled, as for example pyrazolones, aminoquinolines, hydroxyquinolines, dihydroxyquinolines, monocyclic or polycyclic aromatic amines and aminohydroxy compounds and their substitution products.

The shades of color of the monoazo dyestuffs thus obtainable usually lie between yellow and red to brown. Disazo dyestuffs may also be prepared and these usually yield blue to black shades of color.

The new dyestuffs are distinguished in particular by extraordinarily good fastness to washing and fulling; their other properties, such as fastness to light and uniformity, are also excellent. Besides, they have a high strength of color.

The following examples will further illustrate how the said invention may be carried out in practice but the invention is not restricted to these examples. The parts are by weight.

Example 1

An aqueous hydrochloric acid solution of 15 parts of 1-amino-4-thiocyanobenzene is diazotized at 0° C. and the diazo solution is allowed to flow after a few minutes into a cooled solution of 32 parts of 1-(2-hydroxy-3-carboxy-5-sulphophenyl)-3-methyl-5-pyrazolone which has been rendered alkaline with sodium carbonate. The coupling is completed in a short time. The dyestuff is then salted out, pressed after some hours and dried at about 50° C. It dyes wool clear yellow shades and, in addition to other good properties, has an excellent uniformity and fastness to washing and fulling.

The dyestuff corresponds to the formula

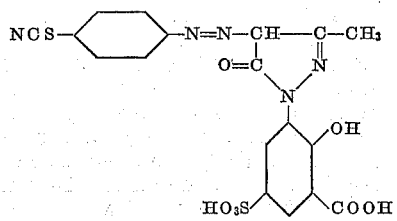

A similar dyestuff having a somewhat redder shade is obtained by employing 1-amino-4-thiocyanobenzene-2-carboxylic acid instead of 1-amino-4-thiocyanobenzene. If 1-amino-2-methyl-4-thiocyanobenzene or 1-amino-2,5-dimethyl-4-thiocyanobenzene be employed as the diazo component, dyestuffs are obtained with the said pyrazolone which have a still redder shade; these have the same excellent properties but have an even better uniformity.

The said dyestuffs or the dyeings obtained therewith, yield fast dyeings after treatment with agents supplying metals.

By employing other pyrazolone derivatives, further dyestuffs may be obtained by coupling with the various thiocyanoamines; the shades of color of these dyestuffs lie between greenish yellow and deep orange.

Thus for example dyestuffs may be prepared from 1-phenyl-3-methyl- (or -3-carboxy- or -3-phenyl-) -5-pyrazolone which contains in the phenyl group a sulphonic acid group in the 2-, 3- or 4-position and which may also contain from one to three halogen atoms or from one to three alkyl or hydroxyalkyl groups, or from pyrazolones which contain sulphonated naphthyl groups instead of sulphonated phenyl groups.

*Example 2*

15 parts of 1-amino-4-thiocyanobenzene are diazotized in the manner described in Example 1 and the diazo compound is coupled in a solution rendered alkaline with sodium carbonate with 24.1 parts of 2,4-dihydroxyquinoline sulphonic acid (obtainable in the following manner: 112.7 parts of dihydroxyquinoline are, while stirring, introduced into 225.4 parts of 24 per cent oleum at about 25° C. The whole is stirred for 4 hours at 125° C. The reaction mass is then poured into 700 parts of water. After stirring for several hours the reaction product which is a sulphonic acid of 2,4-dihydroxyquinoline containing most probably the sulphonic acid group in the 6- or 7-position, is filtered off by suction and washed with water). The resulting dyestuff dyes wool from an acid bath reddish yellow shades of good fastness to washing and fulling.

The dyestuff corresponds to the formula

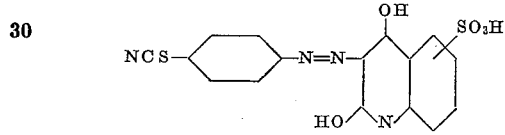

Instead of 1-amino-4-thiocyanobenzene, other amines containing the thiocyanogen group may be employed. Furthermore, the dihydroxyquinoline sulphonic acid may be replaced for example by N-methyl-4-hydroxy-2-quinolone sulphonic acid (obtainable in the following manner: 140 parts of N-methyl-4-hydroxy-2-quinolone are introduced at about 25° C. into 257.6 parts of 24 per cent oleum. The mixture is then heated, while stirring, for 4 hours at 125° C. After further adding 30 parts of 24 per cent oleum the mass is further stirred at 130° C. for 10 hours. It is then poured into 830 parts of water and further stirred for several hours. The reaction product which contains a sulphonic acid group most probably in the 6- or 7-position of the N-methyl-4-hydroxy-2-quinolone, is then filtered off by suction and washed with water).

*Example 3*

The diazo compound derived from 15 parts of 1-amino-4-thiocyanobenzene is coupled in acetic acid solution with 22.6 parts of 1-aminonaphthalene-4-sulphonic acid. Sodium carbonate is then introduced until the solution is alkaline and a dyestuff is thus obtained which dyes wool from an acid bath red-orange shades of excellent fastness to washing and fulling.

It corresponds to the formula

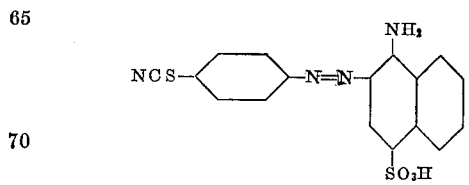

The corresponding dyestuff derived from 2-aminonaphthalene-6-sulphonic acid yields more yellowish orange shades. Orange shades are also obtained with dyestuffs derived from other aminonaphthalene sulphonic acids capable of being coupled.

*Example 4*

By coupling the diazo compound of aromatic thiocyanoamines with aminohydroxynapthalene sulphonic acids, dyestuffs are obtained the shade of which varies, depending on the coupling component selected, between scarlet and ruby red to brown. For example by coupling the diazo compound derived from 15 parts of 1-amino-4-thiocyanobenzene in a solution rendered alkaline with sodium carbonate with 34.3 parts of 2-aminobenzoyl-5-hydroxynaphthalene-7-sulphonic acid, a yellowish red dyestuff is obtained.

It corresponds to the formula

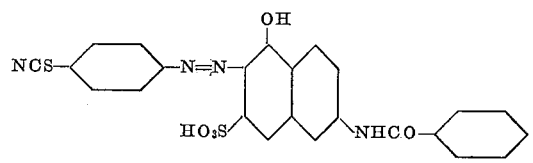

By coupling the same amount of the same diazo compound with 49.3 parts of 1-(2',5'-dichlorbenzoyl)-amino-8-hydroxynaphthalene-4,6-disulphonic acid in a solution rendered alkaline with sodium carbonate, a dyestuff is obtained which dyes wool ruby red shades.

Dyestuffs yielding brown shades are obtained by employing 2-(N-phenyl- or -methyl-)amino-8-hydroxynaphthalene-6-sulphonic acid instead of the said coupling components. Thus for example a dyestuff which dyes wool red-brown shades is obtained by coupling the diazo compound derived from 15 parts of 1-amino-4-thiocyanobenzene with 31.5 parts of 2-(N-phenyl)- or 25.3 parts of 2-(N-methyl)-amino-8-hydroxynaphthalene-6-sulphonic acid in a solution rendered alkaline with sodium carbonate. The phenyl groups may also contain alkoxy or carboxylic groups.

*Example 5*

The diazo compound derived from 13.8 parts of 1-amino-4-nitrobenzene is coupled in hydrochloric acid solution with 31.9 parts of 1-amino-8-hydroxynaphthalene-3,6-disulphonic acid; the resulting monoazo dyestuff is then coupled in a solution rendered alkaline with sodium carbonate with the diazo compound derived from 15 parts of 1-amino-4-thiocyanobenzene. A greenish blue primary disazo dyestuff is thus obtained.

It corresponds to the formula

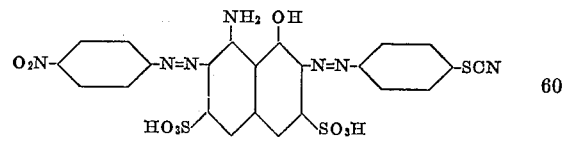

The thiocyanoamine may also be first coupled in acid solution with a compound capable of coupling twice, the resulting monazo dyestuff containing thiocyanogen groups then being coupled with the diazo compound of an aromatic amine which itself may also contain thiocyanogen groups. Generally speaking, blue to blue-black disazo dyestuffs fast to washing and fulling are thus obtained.

*Example 6*

The diazo compound derived from 15 parts of 1-amino-4-thiocyanobenzene is coupled in acetic acid solution with 22.3 parts of 1-aminonaphthalene-6-sulphonic acid. The resulting monoazo dyestuff is then diazotized with 6.9 parts of sodium nitrite and hydrochloric acid, the resulting diazo compound being coupled with 31.3 parts of 1-(4-methylphenyl)-aminonaphthalene-8-sulphonic acid while adding sodium acetate. A blue secondary disazo dyestuff is thus obtained which is fast to washing and fulling. It corresponds to the formula

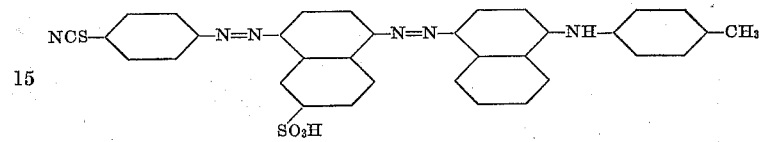

*Example 7*

The diazo compound derived from 15 parts of 1-amino-4-thiocyanobenzene is coupled in a solution rendered alkaline with soda with 33 parts of 1-(2,5-dichloro-4-sulphophenyl)-3-methyl-5-pyrazolone. The resulting monoazo dyestuff gives on wool clear yellow shades of excellent fastness to light, to washing and fulling. It corresponds to the formula

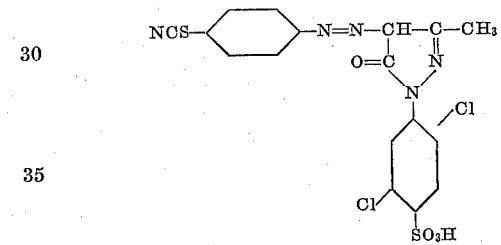

What we claim is:—

1. The azo dyestuff corresponding to the formula

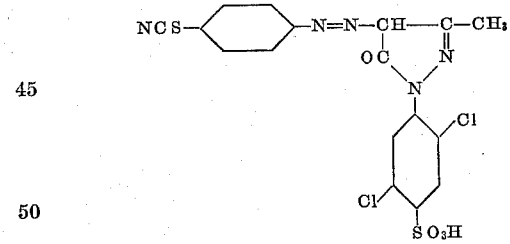

2. The azo dyestuff corresponding to the formula

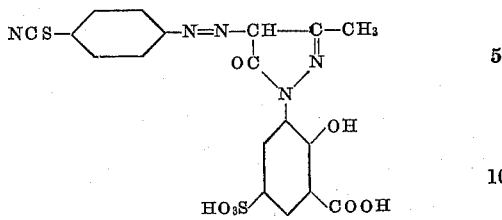

3. The azo dyestuff corresponding to the formula

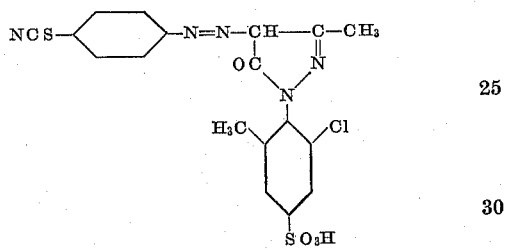

4. An azo dyestuff having the general formula

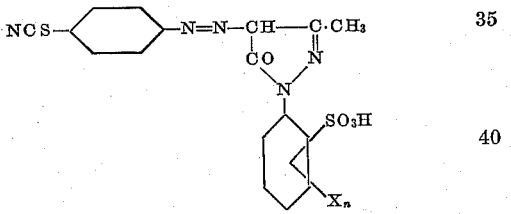

wherein X stands for a substituent selected from the class consisting of halogen and the hydroxyl, carboxyl and low molecular alkyl groups, and $n$ for a whole number from 1 to 2.

KARL HOLZACH.
LUDWIG NEUMANN.